United States Patent
Denk et al.

(10) Patent No.: US 10,819,268 B2
(45) Date of Patent: Oct. 27, 2020

(54) DRIVING DEVICE COMPRISING A TRANSFORMER FUNCTION, DRIVING SYSTEM AND METHOD FOR OPERATING A DRIVING DEVICE

(71) Applicant: ZF Friedrichshafen AG, Friedrichshafen (DE)

(72) Inventors: Marco Denk, Memmelsdorf (DE); Mark-Matthias Bakran, Erlangen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 16/287,765

(22) Filed: Feb. 27, 2019

(65) Prior Publication Data

US 2019/0273459 A1 Sep. 5, 2019

(30) Foreign Application Priority Data

Mar. 2, 2018 (DE) .......................... 10 2018 203 134

(51) Int. Cl.
*H02P 25/22* (2006.01)
*H02P 25/30* (2006.01)
(Continued)

(52) U.S. Cl.
CPC .............. *H02P 25/30* (2013.01); *H02P 25/22* (2013.01); *H02P 27/08* (2013.01); *B60L 50/51* (2019.02);
(Continued)

(58) Field of Classification Search
CPC .......... H02P 27/06; H02P 27/08; H02P 25/22; H02P 27/14
See application file for complete search history.

(56) References Cited

U.S. PATENT DOCUMENTS 5,264,736 A * 11/1993 Jacobson ................ H02M 1/38
327/100
5,504,414 A * 4/1996 Kinoshita ................ B60L 7/14
180/65.8

(Continued)

FOREIGN PATENT DOCUMENTS

| DE | 10 2010 062 376 A1 | 6/2012 |
| DE | 10 2012 202 764 A1 | 8/2013 |

OTHER PUBLICATIONS

Office Action dated Sep. 18, 2018 for German Patent Application No. 10 2018 203 134.7, (9 pgs), note: pp. 1 and 2 are English language Explanations to Section C Result of Determination of Document.

*Primary Examiner* — Thai T Dinh
(74) *Attorney, Agent, or Firm* — Brinks Gilson & Lione (57) ABSTRACT

A drive device (102) with a converter function for a vehicle (100) has at least one first motor connection and one second motor connection for connecting the drive device (102) to a converter (108), a least one first motor coil and one second motor coil, wherein a first connection of the first motor coil is connected to the first motor connection and a first connection of the second motor coil is connected to the second motor connection, at least one first intermediate tap and one second intermediate tap, wherein the first intermediate tap is connected to a first tap point of the first motor coil and the second intermediate tap is connected to a first tap point of the second motor coil, and at least one first supply line connection and one second supply line connection for connecting the drive device (102) to an AC voltage supply line, wherein the first supply line connection is connected to the first intermediate tap and the second supply line connection is connected to the second intermediate tap.

19 Claims, 5 Drawing Sheets

(51) Int. Cl.
*H02P 27/08* (2006.01)
*B60L 50/60* (2019.01)
*B60L 50/51* (2019.01)

(52) U.S. Cl.
CPC ........... *B60L 50/60* (2019.02); *B60L 2210/42* (2013.01); *B60L 2220/50* (2013.01); *B60Y 2200/91* (2013.01); *B60Y 2400/604* (2013.01); *B60Y 2400/61* (2013.01)

(56) References Cited

U.S. PATENT DOCUMENTS

| | | | | |
|---|---|---|---|---|
| 5,506,484 | A * | 4/1996 | Munro | B60L 3/0069 318/599 |
| 8,629,636 | B2 * | 1/2014 | Bouchez | H02K 3/28 318/139 |
| 9,873,342 | B2 * | 1/2018 | De Sousa | H02J 7/02 |
| 2010/0071970 | A1 * | 3/2010 | Welchko | B60K 1/00 180/65.1 |
| 2011/0316462 | A1 * | 12/2011 | Bouchez | H02P 25/16 318/400.29 |
| 2015/0274024 | A1 * | 10/2015 | Da Costa | H02J 7/02 320/109 |
| 2015/0381076 | A1 * | 12/2015 | Sadki | H02P 29/032 363/132 |
| 2016/0077566 | A1 * | 3/2016 | Caubert | B60L 50/40 713/340 |
| 2019/0092180 | A1 * | 3/2019 | Zhu | B60L 15/00 |

* cited by examiner

DRIVING DEVICE COMPRISING A TRANSFORMER FUNCTION, DRIVING SYSTEM AND METHOD FOR OPERATING A DRIVING DEVICE

RELATED APPLICATIONS

This application claims the benefit of priority under 35 U.S.C. § 119(a) of German Application No. 102018203134.7, filed Mar. 2, 2018, the content of which is incorporated herein by reference in its entirety.

FIELD

The present invention relates to a drive device with a converter function, a drive system, and a method for operating a drive device for a motor vehicle.

DESCRIPTION OF RELATED ART

In order to charge a high voltage battery, e.g. in an electric vehicle, a charging system must substantially provide a DC voltage, the voltage of which is greater than the battery voltage. If a high voltage battery (HV battery) with a battery voltage of 400V-DC is to be charged, for example, on a conventional power socket with an single-phase AC voltage of 230V-AC or an HV battery with a battery voltage of 800V-DC is to be charged on a three-phase AC voltage with 400V-AC, this requires, in addition to the rectification of the supply voltage (AC→DC), an increase in the rectified voltage, e.g. by a DC/DC converter, also referred to as a boost converter, or a step-up converter.

SUMMARY

Based on this, the present invention provides an improved drive device with a converter function, an improved drive system and an improved method for operating a drive device for a vehicle according to the independent claims. Advantageous embodiments can be derived from the dependent claims and the following description.

The approach described herein is based on a novel use of a drive device in the form of an electric machine serving as an autotransformer. The drive device can be advantageously used in conjunction with a drive train for a vehicle, wherein the drive train can be composed of a battery, an inverted rectifier, and a drive device. The drive device can be an electric motor for powering the vehicle. The drive device can be an electric machine with an autotransformer function, also referred to as an electric machine autotransformer. The drive device can be used in this manner to charge an HV battery on a single- or three-phase AC voltage. As a result, a separate charging device is not needed, which would be composed of a rectifier (for rectifying the supply AC voltage) and a downstream DC/DC converter. The latter would increase the rectified supply AC voltage to a voltage level suitable for charging the HV battery. By eliminating such a separate charging device, costs and installation space can be reduced.

Advantageously, the approach described herein can be implemented without the need for switches in the drive device, e.g. in order to disengage the neutral point or interrupt connecting lines between the motor coils and the connections to the drive device. Furthermore, no additional coils are needed that would be used exclusively for a converter function and not for a drive function of the drive device.

A corresponding drive device with a converter function for a vehicle has the following features:
at least one first motor connection and a second motor connection for connecting the drive device to a converter;
at least one first motor coil and one second motor coil, wherein a first connection of the first motor coil is connected to the first motor connection and a first connection of the second motor coil is connected to the second motor connection;
at least one first intermediate tap and a second intermediate tap, wherein the first intermediate tap is connected to a tap point of the first motor coil and the second intermediate tap is connected to a tap point of the second motor coil; and
at least a first supply line connection and a second supply line connection for connecting the drive device to an AC voltage supply line, wherein the first supply line connection is connected to the first intermediate tap, and the second supply line connection is connected to the second intermediate tap.

The drive device can be an electric machine with a stator and a rotor. Such an electric machine can be a synchronous, asynchronous, or reluctance machine. When a current flows through the motor coils, they generate magnetic fields that exert torques on the rotor. As a result, the drive device can fulfill a drive function when the motor coils are supplied with an appropriate current via the motor connections. In order to fulfill the converter function, the motor coils can be supplied with an appropriate current by applying a supply AC voltage to the supply line connections via the intermediate taps. The motor coils can then fulfill the functionality of an autotransformer in this case. The supply AC voltage at the supply connections is converted by the motor coils to a charging AC voltage that can be tapped into at the motor connections. With an appropriate positioning of the tap points inside the motor coils, a voltage ratio between the supply AC voltage and the converted charging AC voltage that can be tapped into at the motor connections is obtained. A tap point can be an electrically conductive contact point on one of the numerous windings of a motor coil, which is connected in an electrically conductive manner to an intermediate tap. A converter can be a device for converting a DC voltage to an AC voltage and vice versa. By way of example, an inverter, such as is used in drive trains for an electric vehicle, can be used as a converter. The drive device can comprise two, three, or more motor coils. All or just some of the motor coils can have an intermediate tap. Typically, the drive device has three motor coils.

According to one embodiment, a first number of windings can be located between the first connections for the motor coils and the intermediate taps, and a second number of windings, differing from the first number, can be located between the second connections of the motor coils and the intermediate taps. As a result, sections of the motor coils located on both sides of the intermediate taps can each have different numbers of windings. It is possible to define a ratio between the supply AC voltage at the supply connections and the charging AC voltage that can be tapped at the motor connections through the ratio between the first number and second number of windings.

The motor coils can each represent a primary coil with regard to the converter function. The second number of windings of a motor coil can represent a secondary coil with regard to the converter function. In this manner, the motor coils that are used for the drive function of the drive device can also be used as a converter.

In order to be able to use supply networks of different voltages for charging the battery, there can be at least one further intermediate tap and at least one further second intermediate tap. The additional first intermediate tap can be connected to a further tap point of the first motor coil and the second additional intermediate tap can be connected to a further tap point of the second motor coil.

The drive device can have a third motor connection for connecting the drive device to the converter and a third motor coil. The first connection of the third motor coil can be connected to the third motor connection. As a result, the drive device can be a three-phase electric machine, such as is typically used with electric vehicles.

The drive device can have a third intermediate tap, wherein the third intermediate tap is connected to a tap point of the third motor coil. Furthermore, the drive device can have a third supply line connection for connecting the drive device to the AC voltage supply line, wherein the third supply line connection is connected to the third intermediate tap. When the drive device has only two intermediate taps and supply line connections, the drive device can be used for converting a single-phase AC voltage. When the drive device has three intermediate taps and supply line connections, the drive device can be used for converting a three-phase supply AC voltage.

According to different embodiments, the motor coils can be located in a hard-wired star circuit or a hard-wired delta circuit. As a result, electric machines typically used in the automotive industry can be used as the basis for the drive device.

The drive device can be advantageously used in conjunction with a drive system for a vehicle, which, in addition to the drive device, also has the aforementioned converter. Such a drive system is also referred to as a drive train. The motor connections of the drive device are connected to AC voltage connections of the converter. By way of example, the converter can be a B6 pulse inverter. The drive system can also comprise a battery, e.g. an HV battery, which is connected to DC voltage connections of the converter. When the converter function of the drive device is used, the battery be charged via the converter. The voltage provided by the battery can be used for the drive function of the drive device, thus discharging the battery.

According to one embodiment, the drive device can have three motor connections. The drive system can have a second converter, which can be connected to the additional motor connections. DC voltage connections of the converter that can be assigned a pole can be interconnected by a switch. The three further motor connections can be connected to second connections of the motor coils. When the switch is disengaged, the three additional motor connections can be connected in the manner of a star point.

A method for operating the aforementioned drive device has the following steps:
Application of a drive AC voltage to the motor connections in order to obtain a drive function of the drive device by supplying current to the motor coils;
Supplying a supply AC voltage to the supply line connections in order to provide a converted charging AC voltage to the motor connections by means of the motor coils.

The application and supply steps can be executed sequentially. The steps can also be repeated. By way of example, numerous application steps can be executed sequentially, before the supply step is executed.

The execution of the steps of the method can be controlled by a control device. Such a control device can be an electric device that processes electric signals, e.g. sensor signals, and outputs control signals as a result thereof. The control device can have one or more appropriate interfaces, which can be hardware or software interfaces. With hardware interfaces, they can be part of an integrated circuit, for example, in which functions of the control device are implemented. The interfaces can also be discrete integrated circuits or at least be composed of discrete components. With software interfaces, they can be software modules on a motor controller, in addition to other software modules.

BRIEF DESCRIPTION OF THE DRAWINGS

The invention shall be explained in greater detail based on the attached drawings. Therein.

DETAILED DESCRIPTION

In the following description of preferred exemplary embodiments of the present invention, the same or similar reference symbols are used for the elements having similar functions shown in the different figures, wherein there shall be no repetition of the descriptions of these elements.

Figure 1:
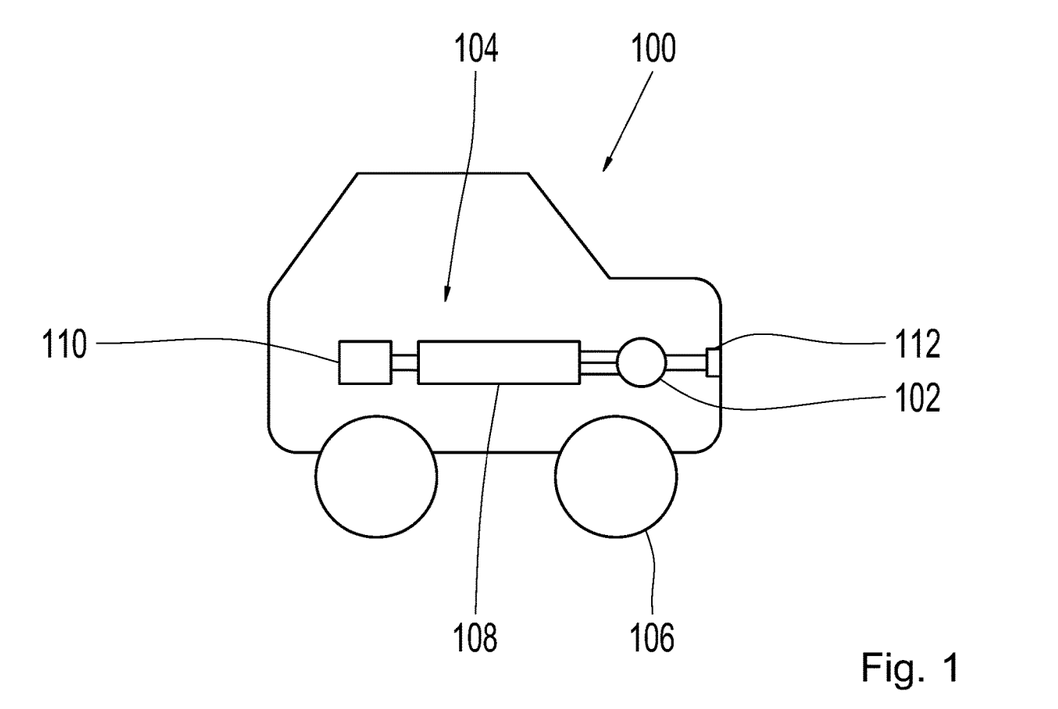
FIG. 1 shows a vehicle with a drive device according to an exemplary embodiment.

FIG. 1 shows a vehicle 100 with a drive device 102 according to an exemplary embodiment. The drive device 102 is part of a drive system 104 of the vehicle 100. The drive system 104 is referred to as a drive train. The drive device 102 is used in accordance with this exemplary embodiment for powering at least one wheel 106 of the vehicle.

In addition to the drive device 102, the drive system 104 comprises a converter 108 and a battery 110. The battery 110 is configured to supply a DC voltage to the converter 108. The converter 108 is configured to supply a motor AC voltage to the motor connections of the drive device 102 using the DC voltage. The drive device 102 is configured to supply a drive torque in response to the motor AC voltage. Consequently, the drive device 102 can fulfill a drive function.

In order to recharge the battery 110, the vehicle has, by way of example, a charger socket 112. The charger 112 can include the poles L1 (phase), N (neutral) and GND (ground) in a single-phase AC voltage of 230V-AC, and the poles L1, L2, L3 (phases), N (neutral), and GND (ground) in a three-phase AC voltage of 400V-AC. The vehicle 100 can be connected to a supply line via the charger socket 112. When the charger socket 112 is connected to the supply line, a supply AC voltage can be provided at the supply line connections of the drive device 102. The drive device 102 has a converter function and is configured to convert the supply AC voltage to a charging AC voltage, which has a voltage amplitude that differs from the supply AC voltage. The drive device 102 is configured to supply the charging AC voltage to the motor connections. The converter 108 is configured to convert the charging AC voltage to a charging DC voltage, and supply this for charging the battery 110. Typically, the converter function is carried out when the vehicle 100 is at a standstill, e.g. when the charger socket 112 is connected to the supply lines via an electrical cable. Alternatively, other energy transferring possibilities for the vehicle 100 can also be used.

The motor connections and the supply line connections can be external contact points of the drive device 102. Each of the motor connections can be dedicated to one phase of a three-phase AC voltage.

According to this exemplary embodiment, the drive device 102 is an electric machine, preferably but no necessarily implemented in a star or delta circuit. The drive device 102 can be used in the conventional manner as a drive motor or generator, or also as an autotransformer according to the approach described herein, for charging the battery 110, e.g. an HV battery. The drive device 102 in the form of an autotransformer according to this exemplary embodiment enables the "stepping up" of a supply AC voltage used for charging to an AC voltage with a greater voltage amplitude. The supply AC voltage used for charging is thus increased in a "transformative" manner, such that an AC voltage increase takes place.

By charging the battery 110 with this AC voltage that has been increased in a transformative manner, wherein both components and/or functions are formed by the converter 108 in the form of a rectifier, for example, and the drive device 102 in the form of an electric machine, the remaining voltage ratio that is to be obtained by the step-up converter is reduced by the increase in the AC voltage of the drive device 102 functioning as an autotransformer (step-up converter→DC voltage increase).

The necessary voltage ratio is obtained from the ratio of the supply AC voltage to the battery voltage of the battery 110. It can thus be formed by the sum of the AC voltage increase through the autotransformer function and a DC voltage increase by the operation of the drive device 102 in the form of an electric machine and the converter 108 in the form of a rectifier serving as a step-up converter and rectifier. The drive device 102 serving as an autotransformer obtains an additional degree of freedom with the AC voltage increase, which can be used for optimizing the system, e.g. with regard to losses, ripples, or dimensioning. By way of example, the current at the low voltage side of a step-up converter, and thus the losses in the power semiconductors, can be reduced. Alternatively, the amplitudes of the supply AC voltage can also be increased by the drive device 102 functioning as an autotransformer, such that a subsequent DC voltage increase by a step-up converter can be eliminated entirely. In this case, the entire voltage ratio is formed by the drive device 102 functioning as an autotransformer, and the converter 108 in the form of a rectifier can be operated merely as a rectifier.

Figure 2:
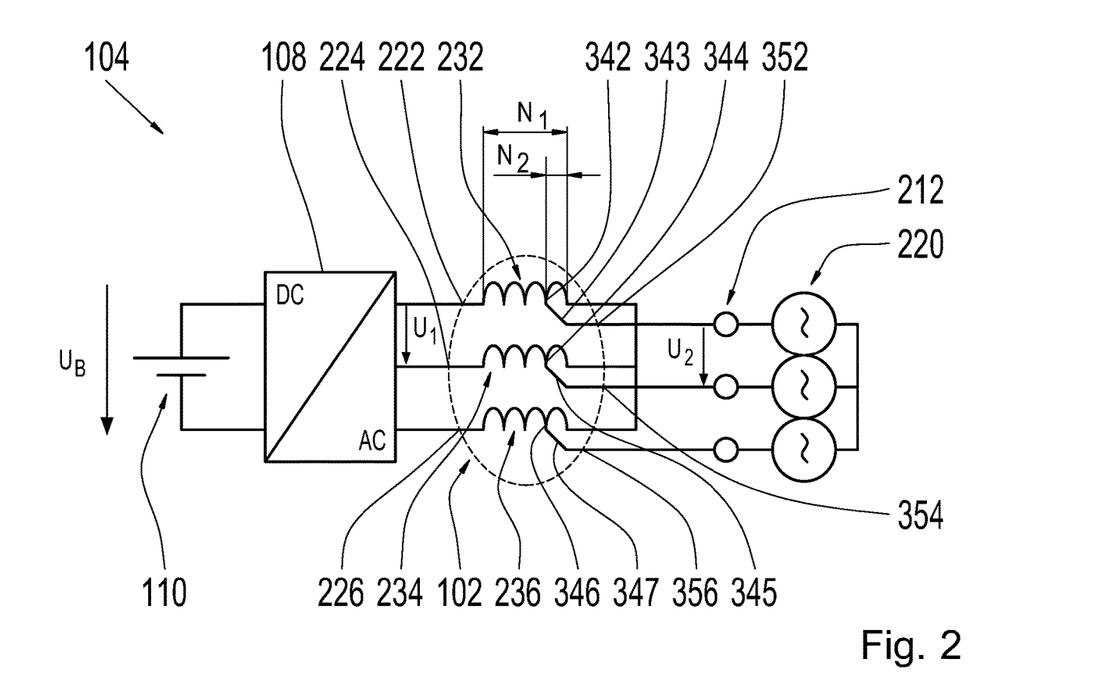
FIG. 2 shows a drive system with a drive device according to an exemplary embodiment.

FIG. 2 shows a drive system 104 with a drive device 102 according to an exemplary embodiment. The drive system 104 can be used, for example, in the vehicle shown in FIG. 1, or in conjunction with another device or another machine.

The drive system 104 includes the drive device 102, a converter 108, and, optionally, a battery 110. These can be components such as those described in reference to FIG. 1. According to the scenario shown in FIG. 2, the drive device 102 is used as a transformer. For this, the drive device 102 is connected to a supply line 220 via connections 212.

According to this exemplary embodiment, the drive device 102 has a first motor connection 222, a second motor connection 224, and a third motor connection 226. Furthermore, the drive device 102 has a first motor coil 232, a second motor coil 234, and a third motor coil 236. The first motor coil 232 has a first tap point 342, which is in electrical contact therewith via a first intermediate tap 343. The second motor coil 234 has a second tap point 344, which is in contact therewith via a second intermediate tap 345. The third motor coil 236 has a third tap point 346, which is in electrical contact therewith via a third intermediate tap 347. Furthermore, the drive device 102 has a first supply line connection 352, a second supply line connection 354, and a third supply line connection 356.

According to one exemplary embodiment, the first motor connection 222 is connected to a first connection of the first motor coil 232 via a through circuit. A through circuit can be a line without any switches. Accordingly, according to one exemplary embodiment, the second motor connection 224 is connected to a first connection of the second motor coil 234 via a through line, and the third motor connection 226 is connected to a first connection of the third motor coil 236 via a through line.

According to the exemplary embodiment shown therein, the second connections of the motor coils 232, 234, 236 are connected to a common star point via through lines.

According to one exemplary embodiment, the first intermediate tap 343 is connected to the first supply line connection 352 via a through line, the second intermediate tap 345 is connected to the second supply line connection 354 via a through line, and the third intermediate tap 357 is connected to the third supply line connection 356 via a through line.

The motor coils 232, 234, 236 each have a first number of windings between the first connections of the motor coils 232, 234, 236 and the intermediate taps 343, 345, 347. The motor coils 232, 234, 236 each have a second number of windings between the second connections of the motor coils 232, 234, 236 and the intermediate taps 343, 345, 347. In the exemplary embodiment shown in FIG. 3, the motor coils 232, 234, 236 have four windings, purely schematically, wherein the second number of windings comprises just one winding, and the first number of windings comprises three windings. The first number of windings differs from the second number of windings. According to this exemplary embodiment, the first number of windings is greater than the second number.

In the transformation operation shown in FIG. 2, a three-phase supply AC voltage is supplied to the supply line connections 352, 354, 356 of the drive device 102 with a first voltage amplitude. The supply AC voltage is applied to the tap points 342, 344, 346 via the intermediate tap 343, 345, 347, by means of which a charging AC voltage is generated, that can be accessed at the motor connections 222, 224, 226. According to this exemplary embodiment, the charging AC voltage applied to the motor connections 222, 224, 226 is converted to a charging DC voltage by the converter 108 for charging the battery 110.

An exemplary embodiment shall be described below in concrete terms based on FIG. 2. For this, the drive system shown in FIG. 2 is regarded as an exemplary drive train, composed of the battery 110 in the form of an HV battery, the converter 108 in the form of a conventional B6 pulse inverter, and the drive device 102 in the form of and electric machine with an autotransformer function. The converter is operated as a rectifier, and optionally, as a step-up converter in conjunction with the electric machine. The electric machine is used as an autotransformer. A three-phase machine, connected in a star form, is shown as the drive device 102, by way of example. The intermediate taps 343, 345, 347 in the motor coils 232, 234, 236 characterize the drive device 102, which form a three-phase autotransformer with the motor coils 232, 234, 236.

Each of the motor coils 232, 234, 236 functions as a primary coil N1 and as a secondary coil N2. As a result, the primary and secondary coils are combined to form a single coil, as is typical in an autotransformer, specifically in each of the motor coils 232, 234, 236, such that there is no galvanic separation. The implementation of the autotransformer function in electric machines, the motor coils 232, 234, 236 of which are permanently connected in a star or triangle pattern, and connected to a converter 108 in three phases, is particularly advantageous, because the complexity and losses thereof are low. Other circuit configurations are also possible, but more complex.

The voltage ratio (ü=U1/U2) with a primary voltage U1 (at the converter) and the secondary voltage U2 (supply AC voltage) is defined by the ratio of the overall number of windings N1 (overall number of motor windings of a strand) to the number of windings N2 before the intermediate tap 343, 345, 347, i.e. (ü=N1/N2). If the supply voltage needs to be increased to a higher voltage level for charging the battery 110 (U1>U2), then the intermediate tap 343, 3456, 347 must be brought to a ratio of ü>1.

According to one exemplary embodiment, a drive device 102 has numerous intermediate taps 343, 345, 347 for each motor coil 232, 234, 236, in order to obtain different ratios for charging at different supply voltages.

An exemplary implementation scenario shall be described in reference to FIG. 2, in which the battery 110 in the form of an HV batter is charged with a battery voltage of UB=800V-DC at the supply line 220 in the form of a conventional three-phase power system with 3×400V-AC, with an effective voltage of U2=400V. The rectifier value for this voltage would be Ud=534V and is consequently too low for charging the battery 110. In order to generate a DC voltage with Ud☐800V, the supply voltage of U2=400V is increased by the autotransformer to U1=493V. The intermediate taps 343, 345, 347 in the motor coils 232, 234, 236 are thus to be brought to a voltage or winding ratio of ü=U1/U2=N1/N2=1.49. The stepped up AC voltage at the secondary side, with an effective value of U1=594V is rectified in the charging state by the converter 108 in the form of an inverter here, from which a DC voltage of 800V is obtained, and used for charging the battery 110.

Figure 3:
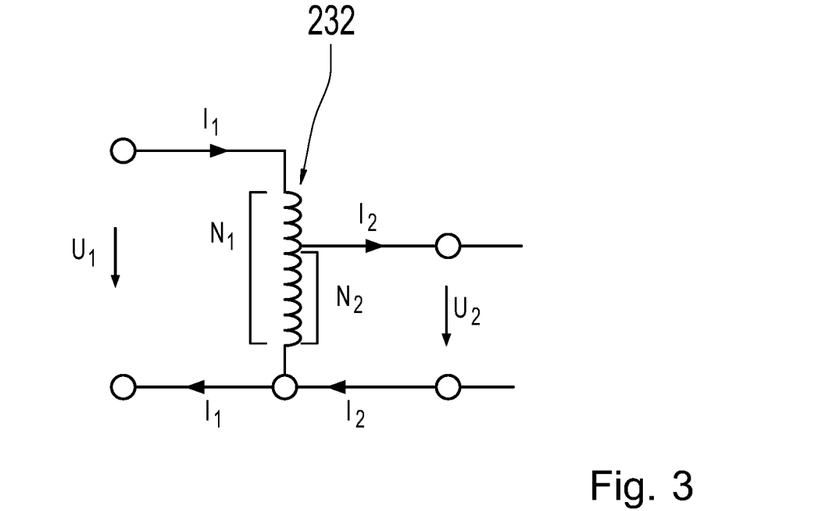
FIG. 3 shows a single-phase equivalent circuit for the drive device shown in FIG. 2 according to an exemplary embodiment.

FIG. 3 shows a single-phase equivalent circuit with regard to the drive device shown in FIG. 2 according to an exemplary embodiment. The voltages U1 and U2 shown in FIG. 2 and the currents flowing through a motor coil 232 are shown therein. The second number of windings N2 assigned to the secondary winding and the entire number of windings N2 assigned to the primary coil of the motor coil 232 are also shown. The equivalent circuit corresponds to the circuit of an autotransformer.

Figure 4:
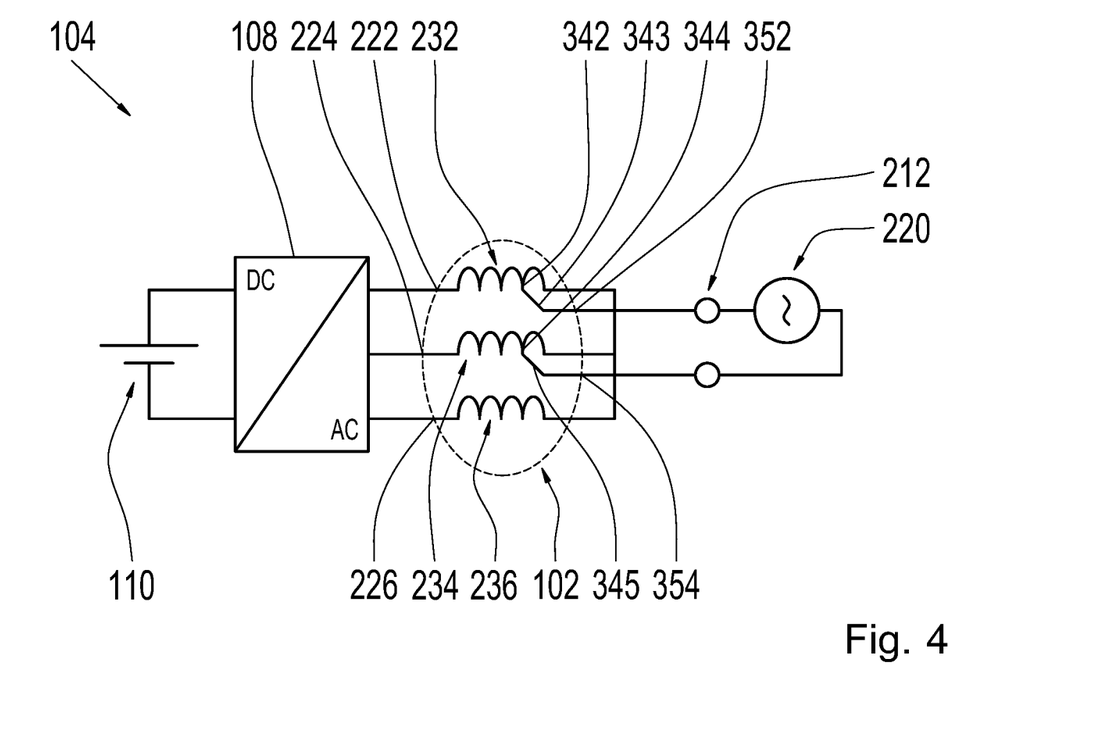
FIG. 4 shows a drive system with a drive device according to an exemplary embodiment.

FIG. 4 shows a drive system 104 with a drive device 102 according to an exemplary embodiment. The drive device 102 differs from the drive device 102 described in reference to FIG. 3 in that only the first motor coil 232 and the second motor coil 234 are provided with a tap point 342, 344. The third motor coil 236 does not have a tap point. As such, the drive device 102 only has one intermediate tap 343 dedicated to the first motor coil 232 and one intermediate tap 345 dedicated to the second motor coil 234, and a first supply line connection 352 and a second supply line 354. The tap point 342 is conductively connected to the first supply line connection 352 via the first intermediate tap 343 and the tap point 344 is conductively connected to the second supply line connection 354 via the second intermediate tap 345.

Because of the two supply line connections 352, 354, the drive device 102 can be connected to a single-phase supply line 220 for charging the battery 110.

According to one exemplary embodiment, the converter 108 is an inverter, operated as an AC/DC converter, and optionally as a DC/DC converter. The drive device 102 in the form of an electric machine is used as an autotransformer, in this case with a single-phase supply AC current. The electric machine forms a star circuit. One possible implementation scenario is the charging of the batter 110, e.g. in the form of a 400V-DC HV battery, at connections 212, e.g. I the form of a 230V-AC socket.

Figure 5:
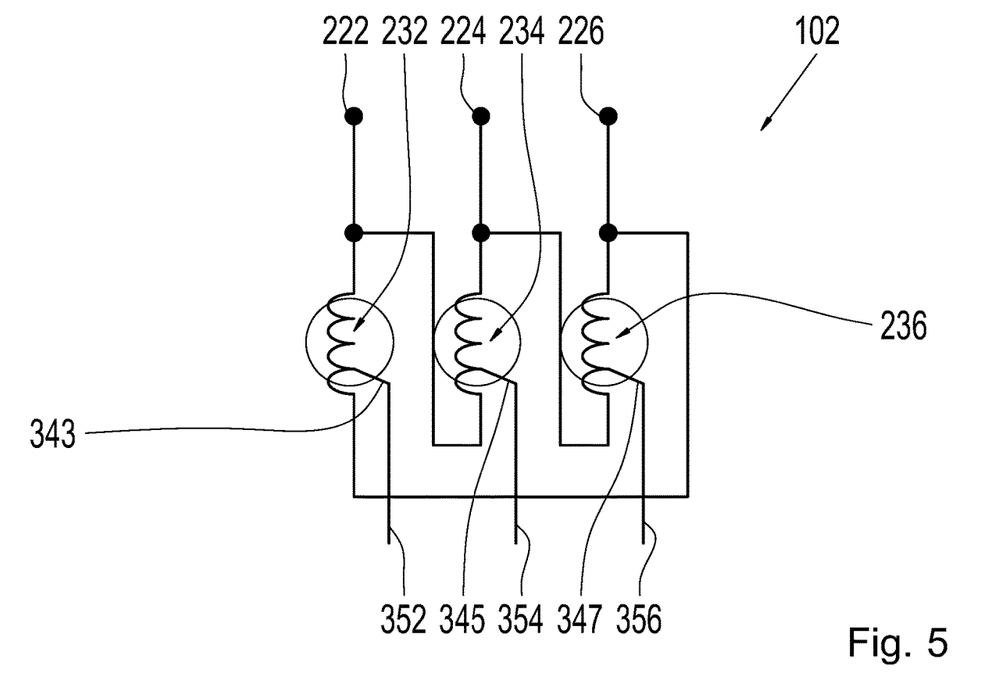
FIG. 5 shows a drive device according to an exemplary embodiment.

FIG. 5 shows a drive device 102 according to an exemplary embodiment. In contrast to the preceding figures, a drive device in the form of an electric machine is shown in FIG. 5, in which the motor coils 232, 234, 236 are connected in the form of a delta connection. A first connection of the first motor coil 232 is connected to a second connection of the second motor coil 234, a first connection of the second motor coil 234 is connected to a third connection of the third motor coil 236, and a first connection of the third motor coil 236 is connected to a second connection of the first motor coil 232 therein.

According to this exemplary embodiment, the drive device 102 has three intermediate taps 343, 345, 347 and three supply line connections 352, 354, 356. Alternatively, there can also be only two intermediate taps 343, 345 and two supply line connections 352, 3534, as explained in reference to FIG. 4.

The drive device 102 in the form of an electric machine, preferably with a permanent star circuit or delta circuit, has the intermediate taps 343, 345, 347 in the motor coils 232, 234, 236. The intermediate taps, together with the motor coils 232, 234, 236, form an autotransformer. This autotransformer function is used for a "step-up conversion" of a supply AC voltage applied thereto via these intermediate taps 343, 345, 347, in single or multiple-phases, with the aim of charging a high voltage battery.

The drive device 102 only has three motor connections 222, 224, 226, which are connected to a B6 converter, for example, when the drive device 102 is in operation. There are no further motor connections according to this exemplary embodiment. The position of the respective intermediate tap 343, 345, 347 defines the voltage ratio. Depending on the exemplary embodiment, the drive device 102 has two or three intermediate taps 343, 345, 347 in the motor coils 232, 234, 236.

The drive device 102 in the form of an electric machine forms a permanent star or delta circuit according to the exemplary embodiments. The intermediate taps 343, 345, 347 of the electric machine form the autotransformer for the "step-up conversion" of the supply voltage.

Advantageously, a step-up conversion of the supply voltage is obtained through an autotransformer function. Rectifying and potentially further "boosting" is obtained through a DC/DC converter of a drive converter (1×136).

The autotransformer function can be easily integrated in a standard drive with an electric machine and a B6 converter. As a result, a single converter is sufficient for both the drive function and the converter function of the drive device 102.

The electric machine is used thereby as an autotransformer for adjusting voltage, resulting in a broader range of uses.

The approach described herein is based on a drive device 102 in the form of an electric machine, preferably in a permanent star or delta circuit, with intermediate taps 343, 345, 347 in the motor coils 232, 234, 236, wherein the intermediate taps 343, 345, 347 form an autotransformer with the motor coils 232, 234, 236. As a result, the electric machine can be used for a "step-up conversion" of the supply AC voltage. Additionally, the motor coils 232, 234, 236 divided by the intermediate taps 343, 345, 347 can be used as inductance for a filter or a DC/DC converter.

The drive device 102 with an autotransformer function described herein can be used for "step-up conversion" of a supply AC voltage, e.g. when charging an HV battery, but also for "step-down conversion" of the AC voltage, e.g. in "car-to-grid" functions, thus to return energy to a supply line, or when the vehicle is used as a mobile AC voltage supply. In such applications, the battery voltage is converted by the converter to an AC voltage, the voltage amplitude of which can be reduced by the drive device with an autotransformer function.

The expression "step-up converted" is used for the autotransformer and refers to a conversion of the AC voltage to an AC voltage with a greater voltage. The expression "stepped up" is used with a DC/DC converter, and refers to a conversion of a DC voltage to a DC voltage with a greater voltage.

Figure 6:
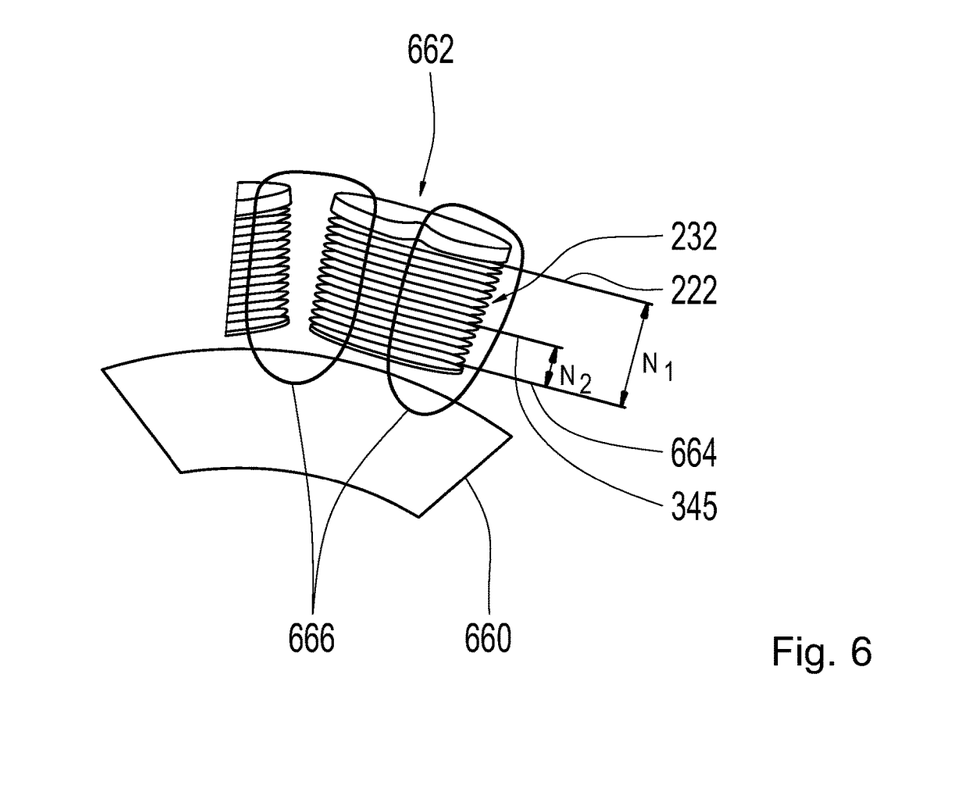
FIG. 6 shows a section of a drive device according to an exemplary embodiment.

FIG. 6 shows a section of a drive device according to an exemplary embodiment. A section of a rotor 660 and a single tooth 662 of a stator of the drive device. The single tooth 662 supports a motor coil 232. A first connection of the motor coil 232 is connected to a star point 664 of the drive device. An intermediate tap 345 in contact with the motor coil 232 is also shown. There are a number of windings N2 located between the intermediate tap 345 and the second connection of the motor coil 232 leading to the star point 664. The motor coil has a total number of windings N1.

A magnetic flux 666 flowing through the motor coil 232 is also shown in FIG. 6.

Figure 7:
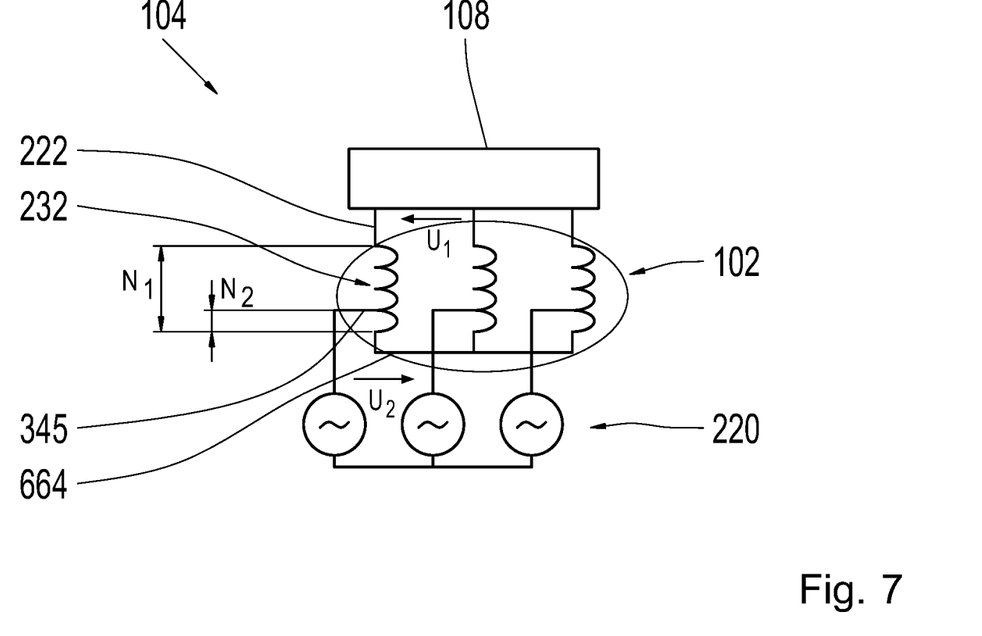
FIG. 7 shows a drive system with a drive device according to an exemplary embodiment.

FIG. 7 shows a circuit diagram of a drive system 104 with a drive device 102 according to an exemplary embodiment. The drive system 104 comprises a converter 108, in addition to the drive device 102. The drive device 102 is coupled to a supply line 220.

The approach described herein shall be described on the basis of an exemplary embodiment in reference to FIGS. 6 and 7. FIG. 6 illustrates a section of the drive device in the form of an electric machine with a motor coil 232 in the form of a single tooth coil in the stator, which is concentric to the rotor 660 of the electric machine, e.g. a synchronous, asynchronous, or reluctance machine.

For each phase, numerous single teeth can be connected in parallel or in series. The single teeth have intermediate taps, by means of which the electric machine, which is connected in a permanent star or delta circuitry in this application, can be used as an autotransformer during the charging process. The autotransformer function is used for a "step-up conversion" of the supply AC voltage, e.g. from a 3-phase 400V-AC to a voltage with a greater amplitude. This stepped up voltage can be rectified or increased further by the converter 108 in the form of an inverter during the charging process. In the present case, the voltage ratio of the autotransformer is characterized by the ratio of the total number of windings N1 of a single tooth 662 and the number of windings N2 up to the intermediate tap 345 to obtain ü=N1/N2.

The drive device 102 in the form of a modified electric machine, preferably in a permanent star or delta circuit, also has intermediate taps 343, 345, 347 in the motor coils 232, 234, 236, in addition to the three motor connections 222, 224, 226 for connecting to the converter 108, also referred to as a drive converter, which represent an autotransformer with the motor coils 232, 234, 236. The intermediate taps 343, 345, 347 are connected to a supply line voltage (AC voltage) during the charging, which is "stepped up" by the autotransformer, such that can be used better for charging an HV battery. The "stepped up" AC voltage is rectified by the drive converter, and potentially "stepped up" further by a DC/DC converter function.

Figure 8:
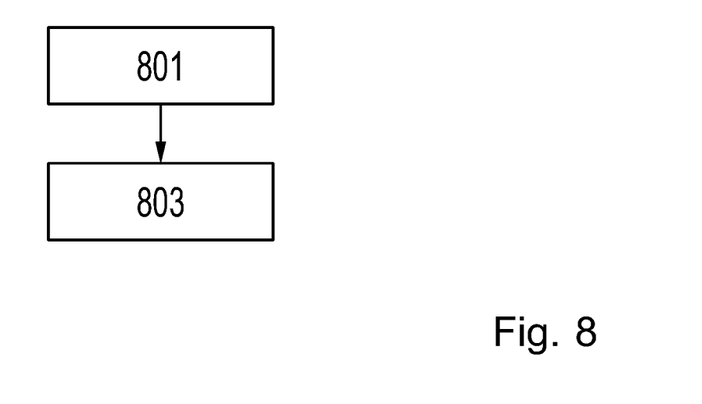
FIG. 8 shows a flow chart for a method for operating a drive device according to an exemplary embodiment.

FIG. 8 shows a flow chart of a method for operating a drive device according to an exemplary embodiment. The drive device can be a drive device like those described in reference to the preceding figures.

In step 801 a drive AC voltage is applied to the motor connections of the drive device. The drive AC voltage supplies an appropriate current to the motor coils, by means of which a rotor of the drive device can be caused to move.

In step 803, a supply AC voltage is supplied to the supply line connections. The supply AC voltage is converted to a charging AC voltage by the motor coils functioning as an autotransformer, which can be tapped at the motor connections.

Steps 801 and 803 can be executed in an arbitrary sequence, and repeated individually or collectively. By way of example, when a vehicle equipped with such a drive device is being driven, step 801 is repeated in order to move the vehicle. If the vehicle is parked in order to recharge the battery, step 803 can be executed.

Figure 9:
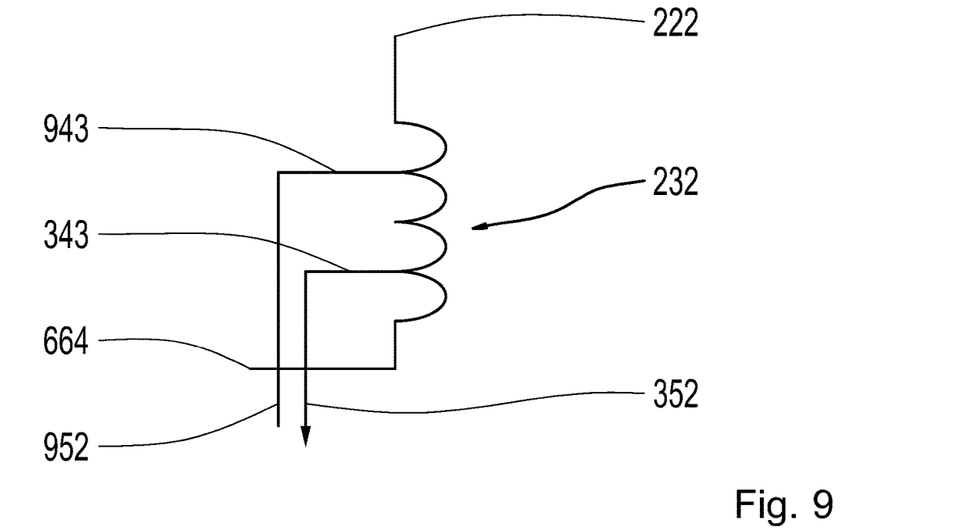
FIG. 9 shows a motor coil according to an exemplary embodiment.

FIG. 9 shows a motor coil 232 of a drive device according to an exemplary embodiment. This can be a motor coil 232 for a drive device described in reference to the preceding figures.

The motor coil 232 is in contact with a first intermediate tap 343, as explained above, which is connected to a first supply line connection 352 of the drive device.

The motor coil 232 is also in contact with a second intermediate tap 943 in the same manner, which is connected to a further first supply line connection 952 of the drive device. The further first supply line connection 952 can be used to connect the drive device to a further supply line, e.g. to charge a battery. The second intermediate taps 343, 943 can be located at appropriate positions on the motor coil 232, depending on the desired conversion ratios.

According to one exemplary embodiment, a drive device with three motor coils 232 has three intermediate taps 343, as described in reference to FIG. 2, in order to be able to connect the drive device to a three-phase supply line, and also two further intermediate taps 943, as described in reference to FIG. 4, in order to be able to connect the drive device to a single-phase supply line.

Figure 10:
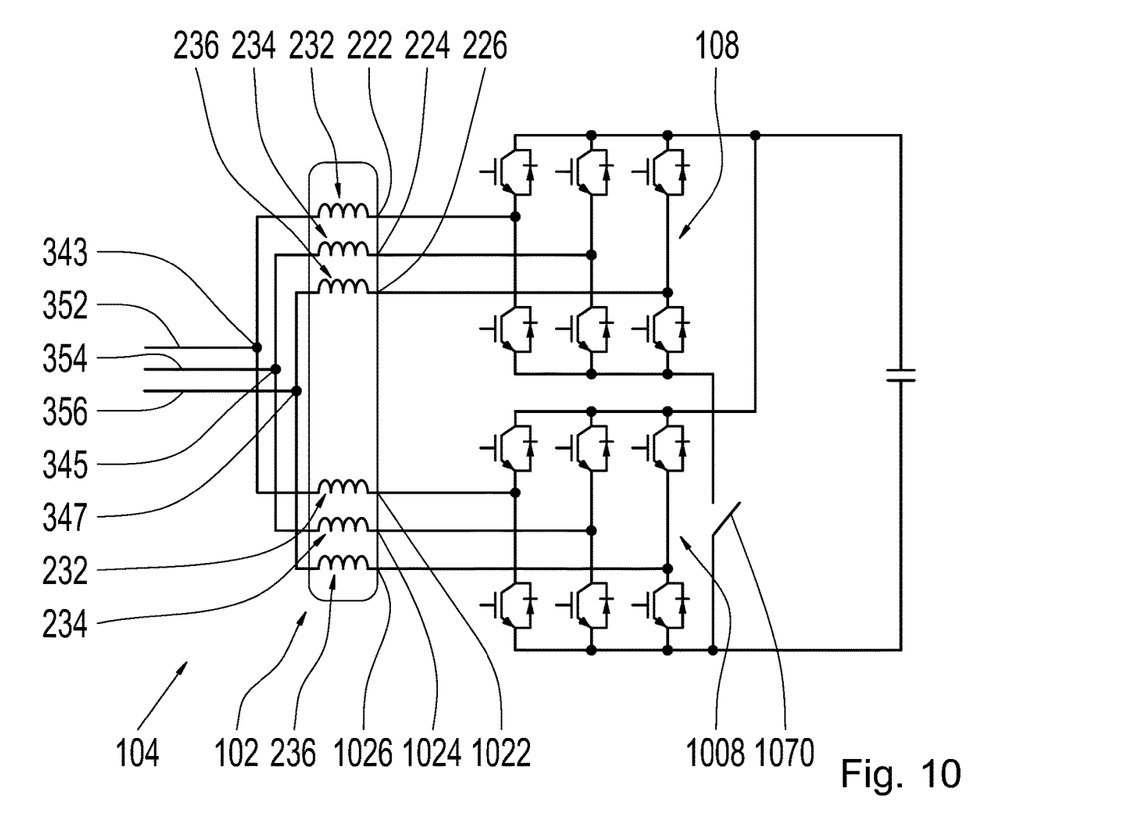
FIG. 10 shows a circuit diagram for a drive system with a drive device according to an exemplary embodiment.

FIG. 10 shows a circuit diagram of a drive system 104 with a drive device 102 according to an exemplary embodiment. The drive system 104 comprises, in addition to the drive device 102, a first converter 108 and a second converter 1008. The drive device 102 has three supply line connections 352, 354, 356, which are connected via intermediate taps 343, 345, 347 to the motor coils 232, 234, 236, which are split according to this exemplary embodiment. The drive device 102 has three motor connections 222, 224, 226, which are connected to the first converter 108 at the AC voltage side. Furthermore, the drive device 102 has three further motor connections 1022, 1024, 1026, which are connected to the second converter 1008 at the AC voltage side. A first DC voltage-side connection of the first converter 108 is connected to a first DC voltage-side connection of the second converter 1008. A second DC voltage-side connection of the first converter 108 is connected to a second DC voltage-side connection of the second converter 1008 via a switch 1070.

According to one exemplary embodiment, the converters 108, 1008 are each inverters with six power semiconductors. By way of example, the three lower power semiconductors of the second converter 1008 are permanently engaged, such that the drive device 102 in the form of an electric machine has a star point. Because this star point is connected according to one exemplary embodiment to a pole of an HV battery (plus or minus pole) depending the switching state, the switch 1070 is provided for disengaging the star point. The overall system comprising the drive device 102 and the converters 108, 1008 forms an "electric machine with an autotransformer function" as a result of this switch.

If the exemplary embodiment comprises and "and/or" conjunction between a first feature and a second feature, this can be read to mean that the exemplary embodiment comprises both the first feature and the second feature according to one embodiment, and either just the first feature or just the second feature according to another embodiment.

REFERENCE SYMBOLS

100 vehicle
102 drive device
104 drive system
106 wheel
108 converter
110 battery
112 charger socket
212 connections
220 supply line
222, 224, 226 motor connections
232, 234, 236 motor coils
342, 344, 346 tap points
343, 345, 347 intermediate taps
352, 354, 356 supply line connections
660 rotor
662 single tooth
664 star point
666 magnetic flux
801 application step
803 supply step
943 further intermediate tap
952 further supply line connection
1008 second converter
1022, 1024, 1026 further motor connections
1070 switch

The invention claimed is:

1. A drive device with a converter function for a vehicle, characterized in that the drive device has the following features:
   a least one first motor connection and one second motor connection for connecting the drive device to a converter,
   at least one first motor coil and one second motor coil, wherein a first connection of the first motor coil is connected to the first motor connection and a first connection of the second motor coil is connected to the second motor connection;
   at least one first intermediate tap and one second intermediate tap, wherein the first intermediate tap is connected to a tap point of the first motor coil and the second intermediate tap is connected to a tap point of the second motor coil; and
   at least one first supply line connection and one second supply line connection for connecting the drive device to an AC voltage supply line, wherein the first supply line connection is connected to the first intermediate tap and the second supply line connection is connected to the second intermediate tap,
   wherein a first number of windings is located between the first connection of the first motor coil and the first intermediate tap and between the first connection of the second motor coil and the second intermediate tap, and
   wherein a second number of windings, differing from the first number of windings, is located between the second connection of the first motor coil and the first intermediate tap and between the second connection of the second motor coil and the second intermediate tap.

2. The drive device according to claim 1, characterized in that the motor coils each form a primary coil, and the second number of windings of the motor coils form a secondary coil with regard to the converter function.

3. The drive device according to claim 2, characterized in that there are at least one further first intermediate tap and one further second intermediate tap, wherein the further first intermediate tap is connected to a further tap point of the first motor coil and the further second intermediate tap is connected to a further tap point of the second motor coil.

4. The drive device according to claim 1, characterized in that there are at least one further first intermediate tap and one further second intermediate tap, wherein the further first intermediate tap is connected to a further tap point of the first motor coil and the further second intermediate tap is connected to a further tap point of the second motor coil.

5. The drive device according to claim 4, characterized in that the drive device has a third motor connection for connecting the drive device to the converter and a third motor coil, wherein the first connection of the third motor coil is connected to the third motor connection.

6. The drive device according to claim 1, characterized in that the drive device has a third motor connection for connecting the drive device to the converter and a third motor coil, wherein the first connection of the third motor coil is connected to the third motor connection.

7. The drive device according to claim 6, characterized in that the drive device has a third intermediate tap, wherein the third intermediate tap is connected to a tap point of the third motor coil, and has a third supply line connection for connecting the drive device to the AC voltage supply line, wherein the third supply line connection is connected to the third intermediate tap.

8. The drive device according to claim 1, characterized in that the motor coils are in a hard-wired star circuit or a hard-wired delta circuit.

9. A drive system for a vehicle, characterized in that the drive system has the converter and the drive device according to claim 1, wherein the motor connections of the drive device are connected to AC voltage connections of the converter.

10. The drive system according to claim 9, characterized in that the drive system has a battery, which is connected to DC voltage connections of the converter.

11. The drive system according to claim 10, characterized in that the converter is a B6 pulse inverter.

12. The drive system according to claim 10, characterized in that the drive device has three further motor connections and the drive system has a second converter, which is connected to the further motor connections, wherein connections of the converter, which can be assigned to a pole, are connected to one another via a switch.

13. The drive system according to claim 9, characterized in that the converter is a B6 pulse inverter.

14. The drive system according to claim 13, characterized in that the drive device has three further motor connections and the drive system has a second converter, which is connected to the further motor connections, wherein connections of the converter, which can be assigned to a pole, are connected to one another via a switch.

15. The drive system according to claim 9, characterized in that the drive device has three further motor connections and the drive system has a second converter, which is connected to the further motor connections, wherein connections of the converter, which can be assigned to a pole, are connected to one another via a switch.

16. The drive device according to claim 9, characterized in that there are at least one further first intermediate tap and one further second intermediate tap, wherein the further first intermediate tap is connected to a further tap point of the first motor coil and the further second intermediate tap is connected to a further tap point of the second motor coil.

17. The drive device according to claim 9, characterized in that the drive device has a third motor connection for connecting the drive device to the converter and a third motor coil, wherein the first connection of the third motor coil is connected to the third motor connection.

18. A method for operating the drive system according to claim 9, characterized in that the method comprises the following steps:
   applying a drive AC voltage to the motor connections, in order to obtain a drive function of the drive device by applying current to the motor coils; and
   supplying a supply line AC voltage to the supply line connections in order to supply a converted charging AC voltage to the motor connections using the motor coils.

19. A method for operating the drive device according to claim 1, characterized in that the method comprises the following steps:
   applying a drive AC voltage to the motor connections, in order to obtain a drive function of the drive device by applying current to the motor coils; and
   supplying a supply line AC voltage to the supply line connections in order to supply a converted charging AC voltage to the motor connections using the motor coils.

\* \* \* \* \*